Sept. 29, 1953
S. G. BEST
2,653,983
THERMOCOUPLE UNIT
Filed Nov. 28, 1951
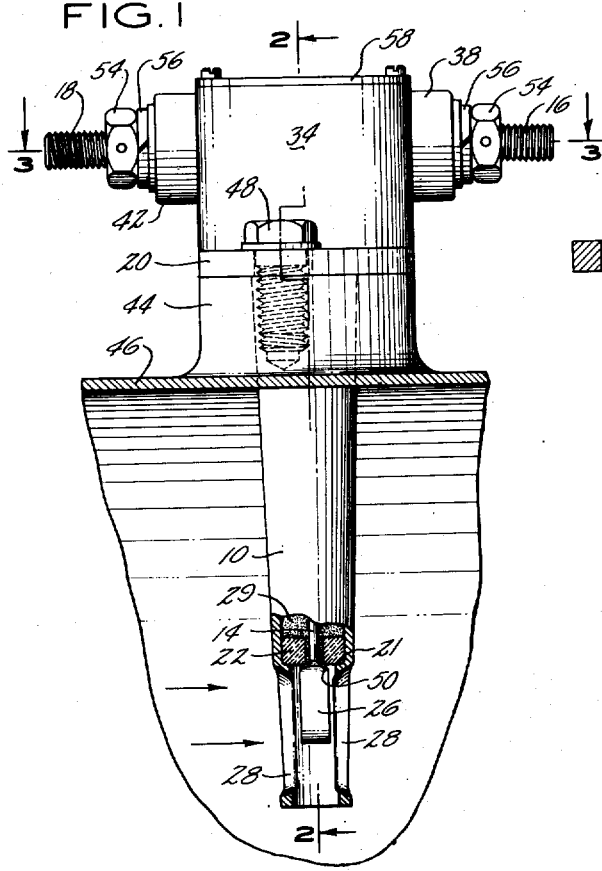
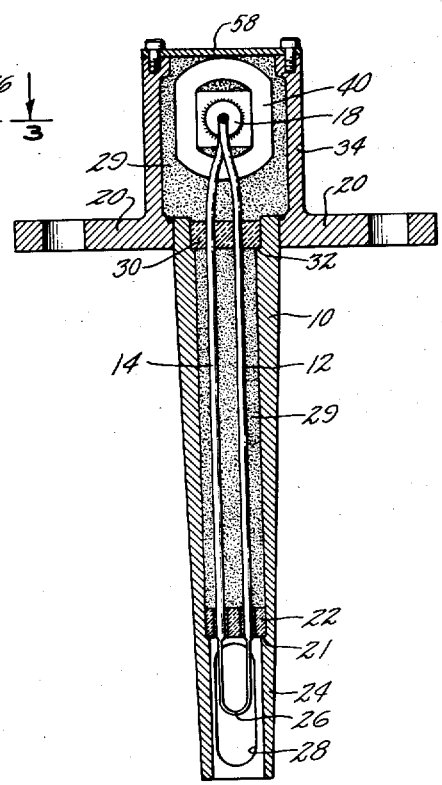
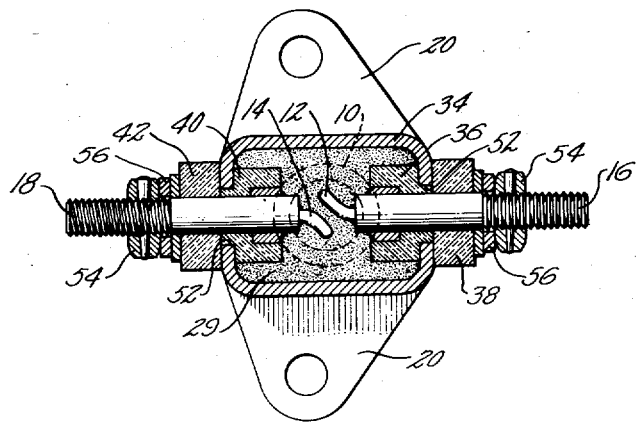
INVENTOR
STANLEY G. BEST
BY Harris G. Luther
ATTORNEY Patented Sept. 29, 1953

2,653,983

UNITED STATES PATENT OFFICE 2,653,983

THERMOCOUPLE UNIT

Stanley G. Best, Manchester, Conn., assignor to United Aircraft Corporation, East Hartford, Conn., a corporation of Delaware Application November 28, 1951, Serial No. 258,717

4 Claims. (Cl. 136—4)

This invention relates to thermocouple units and particularly to the mechanical structure and arrangement of the thermocouple.

An object of this invention is to provide a thermocouple sufficiently rugged to withstand the severe operating conditions found in jet engines.

A further object is to provide a thermocouple in which the thermocouple wires and the hot junction are rigidly supported and amply protected against both radiation and mechanical damage.

A further object is to provide a hot junction having a large area to mass ratio.

A still further object is to provide a thermocouple which can be easily assembled and in which a faulty junction may be scrapped before assembly without the necessity of scrapping the entire assembly Additional objects and advantages may be ascertained from the following specification and the accompanying drawings in which, Fig. 1 is a side view partly in section of the completely assembled thermocouple.

Fig. 2 is a longitudinal section taken on the line 2—2 of Fig. 1.

Fig. 3 is a horizontal sectional view taken on the line 3—3 of Fig. 1.

The invention is shown in the drawing as incorporated in a thermocouple adapted for use in a jet engine and comprising in general a supporting tube 10 in which a pair of wires 12 and 14 of suitable dissimilar metals are supported. One of the wires may be made of Chromel and the other of Alumel. The two wires are joined at one end to form the thermocouple junction and the wires are attached at the opposite end to terminals 16 and 18 respectively. The tube 10 is secured to a mounting flange 20 by means of which the thermocouple may be attached to any selected portion of the exterior of the engine with the hot junction projected into the gas stream whose temperature is to be measured.

Specifically the supporting tube 10 is provided with a shoulder 21 adjacent one end thereof which provides a seat for a ceramic washer 22 through which the wires 12 and 14 pass and are supported. An extension 24 on the tube 10 extends beyond the shoulder 21 and has windows 28 formed therein to permit the passage of gases transversely through the extension. The wires 12 and 14 extend from the interior of tube 10 through the washer 22 and into the interior of the extension 24. The portion of the wires in the extension 24 are welded together and are flattened to form a wide thin junction 26 which is the active portion or hot junction of the thermocouple. This junction 26 is bent into the form of a U with the thin edge of the junction 26 forming the face of the U and is arranged with that thin edge facing the windows so that gases passing transversely through the extension 24 by the way of the windows will pass across the thermocouple junction 26 and the thin edge of the junction 26 will be facing the airstream. This arrangement will provide a large area to mass ratio for the junction 26 which will give a fast response. The flattened number presenting the thin edge to the airstream acts as a strength member to withstand the hot exhaust gas pressures because the thin sections are directed into the exhaust stream.

The extension 24 acts as a radiation shield for the thermocouple unit preventing both radiation from the hot joint and also preventing radiation from the turbine walls or the gas stream enclosure from affecting the thermocouple joint. The extension 24 also acts as an effective protection against mechanical damage to the joint 26, either from objects in the gas stream or damage that might occur in handling or in installation or removal of the thermocouple.

The wires 12 and 14 are surrounded, within the tube 10, by a potting compound 29, preferably Sauereisen cement, which will rigidly support the wires in the tube 10. Some of this cement finds its way around the wires in the ceramic washer 22 and acts to rigidly support the wires and the junction 26 at a point adjacent to the junction 26.

Wires 12 and 14 pass through and are supported by a ceramic washer 30 seated on a shoulder 32 adjacent the other end of the tube 10.

The mounting flange 20, including a housing 34 projecting upwardly therefrom, is welded or otherwise secured to the end of the tube 10 adjacent the ceramic washer 30. The wires 12 and 14 extend from the tube 10 through the ceramic washer 30 and into the housing 34 where they are secured to terminal lugs 16 and 18 respectively. The lugs 16 and 18 extend through ceramic washers 36, 38, 40, 42 and are supported by those ceramic washers which in turn are supported by the housing 34 through which both the terminal lugs 16 and 18 and the ceramic washers extend.

In use, the thermocouple may be mounted on a boss 44 located on a housing or tube 46 through which the hot gases, whose temperature is to be measured, are passing. The thermocouple may be secured to the boss 44 by cap screws 48 passing through the mounting flange 20. The supporting tube 10 carrying the hot junction 26 at the end thereof extends through the boss 44 and into the hot gas stream within the housing 46.

In the manufacture of this thermocouple, one end of wire 12 is welded to one end of wire 14. The welded junction is then flattened and ground to the desired size and finish. This junction is preferably formed so that the wires 12 and 14 lead from opposite ends thereof so that the junction may be bent into the form of a U and the wires brought into parallel relation. It should be understood, however, that the junction may be formed so that both wires lead from one end of the junction and the junction may be left straight or may be bent into any desired shape. The wires extending from one end of the latter junction are, of course, already in parallel relation.

After the junction is formed, it is inspected and if found defective may be discarded at this point without necessity of scrapping any of the rest of the thermocouple. After inspection, ceramic washer 22 is slipped over the free ends of the wires 12 and 14 and placed firmly against the shoulder 50 at the flattened section 26, the wires passing through suitable holes in the washer 22. The wire and washer assembly is then passed through the end of the tube 10 containing the shoulder 32 and the washer 22 is seated against the shoulder 21 at the opposite end of the tube. A locating rod fitting both the windows 28 and the junction 26 is passed through both the windows and the junction to hold the junction in line with the windows. The tube 10 containing the wires 12 and 14 is then filled with a ceramic potting cement 29 and the second ceramic washer 30 is slipped over the free ends of the wires and pressed into position against the shoulder 32, forcing potting cement through the holes in washer 22 and around the wires in those holes to securely anchor the wires 12 and 14 adjacent the hot junction.

After the potting cement has set, the terminals 16 and 18 and their associated ceramic washers are slid into slots 52 in the housing 34 and secured in position by the nuts 54. The wires 12 and 14 are then welded to the terminals 16 and 18. Spring washers 56 are utilized to compensate for the difference in expansion between the terminals 16 and 18 and the ceramic washers through which they pass.

The housing 34 is then completely filled with the potting compound 29 and a cover 58 is tacked or bolted into place.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. A thermocouple comprising a supporting member having an elongated tubular portion, a pair of wires of dissimilar material extending through, and projecting from one end of, said portion, and joined in the projecting part to form the thermocouple junction, a potting cement filling said tubular portion and closely surrounding both of said wires to form a common ceramic support and rigidly support the wires in said portion, said potting cement extending to a point adjacent said junction to rigidly support said junction.

2. A thermocouple comprising a tubular supporting member having internal shoulders adjacent each end, a pair of wires supported in said tubular member and projecting at both ends, projecting portions at one end being joined to form the thermocouple junction, an insulating washer, having separate perforations through which the wires pass, seated against the shoulder in one end of the tubular member and adjacent said junction to support said junction and locate said wires in said tubular member, a potting compound substantially filling said tube and forcing said washer against its supporting shoulder and surrounding both said wires, a second insulating washer through which the wires pass seated on the shoulder in the opposite end of said tube to locate said wires in said tube, terminal portions for said wires and mounting means for said tube.

3. A thermocouple comprising a tubular supporting member, a pair of wires supported in said member and joined at one end to form the thermocouple junction, a common ceramic potting compound supporting substantially the entire length of both wires in said member leaving the junction exposed, mounting means for said tube and lead wires connected to said first-mentioned wires, a window formed in said tube walls adjacent said junction at one end of said tube, said junction comprising a flattened portion bent into a U-shape with the thin edge forming the face of the U and facing said window and with the wide sides of the U adjacent the solid portion of the tube walls whereby the tube walls act as a radiation shield for said junction.

4. The method of making a thermocouple which comprises welding the ends of a pair of thermocouple wires to form a thermocouple junction, flattening said welded junction and then forming it into U shape by bringing the remainder of said wires into juxtaposed substantially parallel position, sliding said wires through the perforation of a perforated washer to a point adjacent said flattened junction, inserting said assembly into a supporting tube with said washer seating on a shoulder and closing one end of said tube and locating the wires in said tube, filling said tube with a potting material, sliding a second washer along said wires and onto said potting material to close the other end of said tube and force potting compounds into the perforation in said perforated washer and locate said wires in said tube and then securing terminal portions onto said wires.

STANLEY G. BEST.

References Cited in the file of this patent

UNITED STATES PATENTS

| Number | Name | Date |
|---|---|---|
| 1,289,116 | Chubb | Dec. 31, 1918 |
| 2,472,808 | Dahl | June 14, 1949 |
| 2,587,391 | Sever | Feb. 26, 1952 |
| 2,597,665 | Nicholls | May 20, 1952 |

OTHER REFERENCES

Automotive Industries, page 46, February 15, 1947.